(12) United States Patent
Janssens et al.

(10) Patent No.: US 9,050,554 B2
(45) Date of Patent: Jun. 9, 2015

(54) DEVICE FOR COMPRESSING AND DRYING GAS

(75) Inventors: Stijn Jozef Rita Johanna Janssens, Denderleeuw (BE); Uwe Pahner, Leuven (BE); Christophe Briers, Hasselt (BE)

(73) Assignee: ATLAS COPCO AIRPOWER, Wilrijk (BE)

( * ) Notice: Subject to any disclaimer, the term of this patent is extended or adjusted under 35 U.S.C. 154(b) by 315 days.

(21) Appl. No.: 13/697,203

(22) PCT Filed: May 11, 2011

(86) PCT No.: PCT/BE2011/000028
§ 371 (c)(1),
(2), (4) Date: Nov. 9, 2012

(87) PCT Pub. No.: WO2011/140616
PCT Pub. Date: Nov. 17, 2011

(65) Prior Publication Data
US 2013/0047661 A1    Feb. 28, 2013

(30) Foreign Application Priority Data

May 11, 2010  (BE) .................................. 2010/0284

(51) Int. Cl.
*B01D 53/02*    (2006.01)
*B01D 53/06*    (2006.01)
(Continued)

(52) U.S. Cl.
CPC ............. *B01D 53/06* (2013.01); *B01D 53/261* (2013.01); *B01D 2259/4005* (2013.01);
(Continued)

(58) Field of Classification Search
CPC ............... B01D 2259/4005; B01D 2259/4009; B01D 53/06; B01D 53/261; F04F 1/18; F28D 7/0083; F28D 7/0091; F28D 7/06; F28D 7/16; F28D 7/1607; F28F 9/0241; F28F 9/22
USPC ................................................ 62/474; 96/128
See application file for complete search history.

(56) References Cited

U.S. PATENT DOCUMENTS

| 358,514 A | 3/1887 | Warden |
| 2,819,882 A | 1/1958 | Stephani |

(Continued)

FOREIGN PATENT DOCUMENTS

| CN | 2341098 Y | 9/1999 |
| CN | 201032430 Y | 3/2008 |

(Continued)

OTHER PUBLICATIONS

International Search Report and Written Opinion of the International Searching Authority dated Jan. 13, 2012, issued in Application No. PCT/BE2011/000028.

(Continued)

*Primary Examiner* — Christopher P Jones
(74) *Attorney, Agent, or Firm* — Bacon & Thomas, PLLC

(57) ABSTRACT

Device for compressing and drying gas includes a multistage compressor with a low pressure stage, a high pressure stage, and a pressure pipe; and an adsorption dryer with a drying zone and a regeneration zone. An intercooler is located between the low pressure stage and high pressure stage, and the device includes a heat exchanger with a main compartment with an inlet part and an outlet part for a first primary fluid. The ends of the tubes of the heat exchanger are connected to a separate inlet compartment and outlet compartment for each series of tubes. A first series of tubes forms a cooling circuit of the intercooler in order to heat up gas from the high pressure stage for the regeneration of the adsorption dryer.

14 Claims, 4 Drawing Sheets

(51) Int. Cl.
  *B01D 53/26* (2006.01)
  *F04F 1/18* (2006.01)
  *F28D 7/00* (2006.01)
  *F28D 7/06* (2006.01)
  *F28D 7/16* (2006.01)
  *F28F 9/02* (2006.01)
  *F28F 9/22* (2006.01)

(52) U.S. Cl.
  CPC .......... *B01D 2259/4009* (2013.01); *F04F 1/18* (2013.01); *F28D 7/0083* (2013.01); *F28D 7/06* (2013.01); *F28D 7/16* (2013.01); *F28D 7/1607* (2013.01); *F28F 9/0241* (2013.01); *F28F 9/22* (2013.01); *F28D 7/0091* (2013.01)

(56) References Cited

U.S. PATENT DOCUMENTS

| | | | | |
|---|---|---|---|---|
| 3,643,451 | A | * | 2/1972 | Foucar ............... 62/623 |
| 5,925,169 | A | | 7/1999 | Vertriest |
| 5,996,356 | A | | 12/1999 | Kishimoto et al. |
| 6,221,130 | B1 | * | 4/2001 | Kolodziej et al. ........... 95/41 |
| 6,514,318 | B2 | * | 2/2003 | Keefer ................... 95/96 |
| 7,007,453 | B2 | * | 3/2006 | Maisotsenko et al. ..... 60/39.511 |
| 7,070,393 | B2 | * | 7/2006 | Vertriest ................. 417/43 |
| 2002/0179294 | A1 | | 12/2002 | Gupte |
| 2003/0188542 | A1 | | 10/2003 | Vertriest |

FOREIGN PATENT DOCUMENTS

| | | |
|---|---|---|
| DE | 19518323 A1 | 11/1996 |
| EP | 0 799 635 | 10/1997 |
| JP | S36-011154 B | 7/1961 |
| JP | 54-84655 U | 6/1979 |
| JP | S56-33479 U | 4/1981 |
| JP | S56-152726 A | 11/1981 |
| JP | S59-186671 U | 12/1984 |
| JP | 60073293 A | 4/1985 |
| JP | 02045128 U | 3/1990 |
| JP | 10306987 A | 11/1998 |
| JP | 2002-022371 A | 1/2002 |
| NL | 75307 | 2/1954 |
| WO | 2011050423 | 5/2011 |

OTHER PUBLICATIONS

English translation of JP 02045128U, previously submitted in IDS filed Sep. 10, 2014.

English translation of Chinese Office Action dated Mar. 25, 2014, for CN 201180023217.9.

English translation of Korean Office Action dated Mar. 27, 2014, for KR 10-2012-7023577.

Japanese Office Action dated Aug. 5, 2014, for JP 2013-509409, and English translation thereof.

* cited by examiner

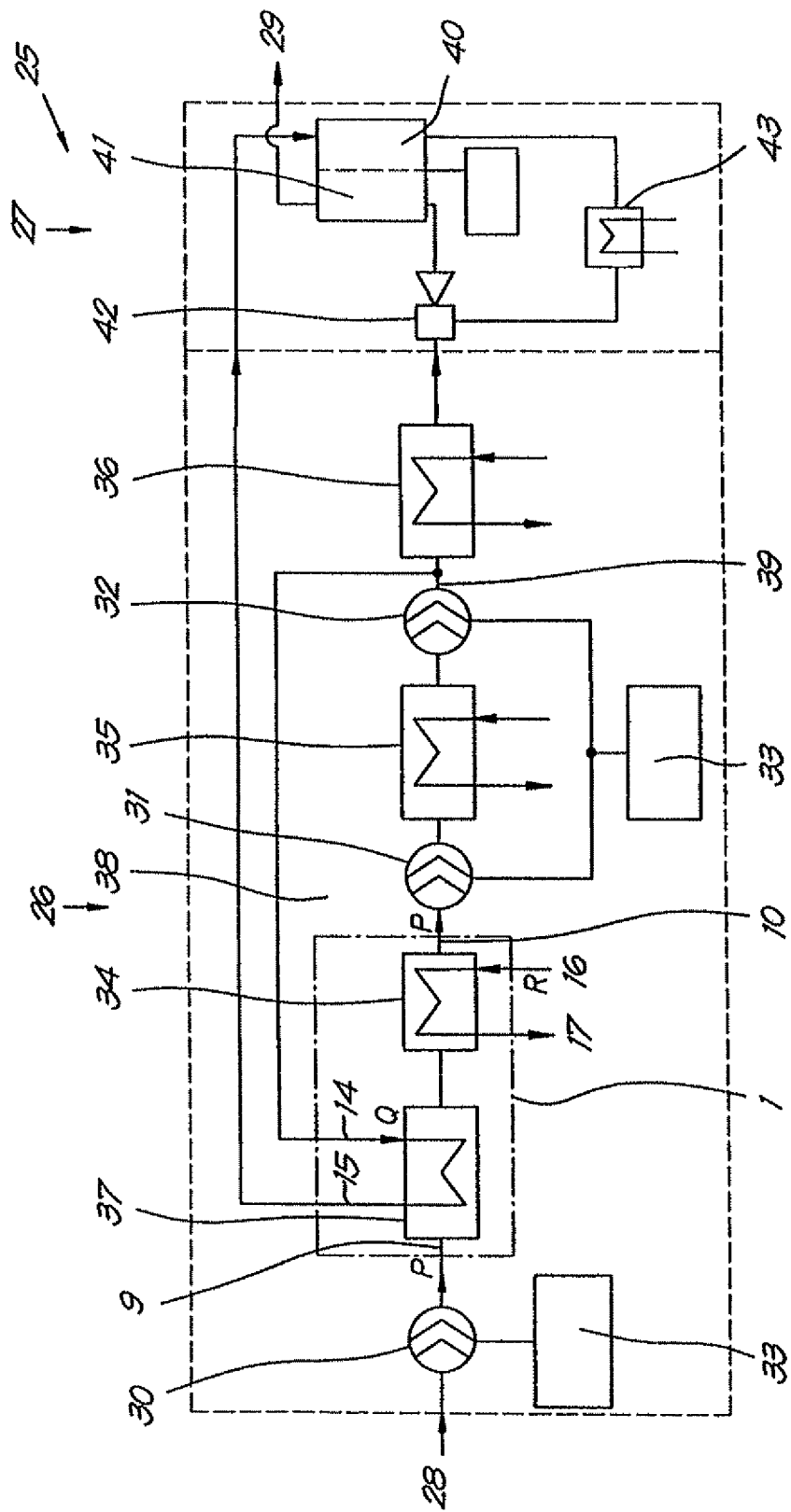

DEVICE FOR COMPRESSING AND DRYING GAS

BACKGROUND OF THE INVENTION

A. Field of the Invention

The present invention relates to a device for compressing and drying gas.

Tube heat exchangers are already known that consist of a housing in which one or more tubes extend in the longitudinal direction between a first inlet and outlet part for a first fluid, and a second inlet and outlet part for a second fluid, whereby the first fluid flows through the tubes and the second fluid flows around the tubes, whereby heat is transferred between the two fluids.

In the known heat exchangers the space in the housing between the second inlet and outlet part can have baffles that guide the flow of the second fluid in a zigzag pattern, for example.

In so doing the second fluid cannot flow directly from the second inlet part to the second outlet part and the heat transfer is improved.

Furthermore, it is known that the compression of a gas is coupled with the generation of an enormous amount of heat.

There are also already heat exchangers in which a fraction of the compressed gas is guided through a primary circuit of a heat exchanger and thus gives off its heat to another gas or liquid flowing through a secondary circuit of the heat exchanger, whereby this second fluid heats up.

Devices have been known for a long time for compressing and drying gas, whereby these devices are composed of a compressor device and a drying device, and whereby the drying device is formed by a drying zone with a desiccant and a regeneration zone.

There are also devices in which the heat generated by the compression of the gas is recovered.

Thus this heat can be used, for example, to heat the gas flow that is guided through the regeneration zone, such that the total energy consumption of the compressor installation can be reduced.

A disadvantage is that the whole arrangement is complex. Moreover, there is a considerable risk of leakage as a result of the many connections that have to be made. The installation cost is also quite high.

The US 2003/0188542 describes a device in which part of the compressed air is tapped off after a medium pressure stage of a compressor, and is then carried to the regeneration zone of an adsorption dryer, after which the absorbed water in this part of the compressed air is removed by cooling, and the remaining air is compressed again with the main flow of the compressed air before the main flow goes through the drying zone of the adsorption dryer and leaves the device as dry compressed air.

A disadvantage of such a device is that the compressed gas after the medium pressure stage has a much lower temperature than the compressed gas after the low pressure stage, such that the tapped-off part of the gas can absorb the water less well from the adsorption medium, and the adsorption medium cannot dry quickly.

To recuperate the heat that is generated upon the compression of the gas, a heat exchanger is needed for which a tube heat exchanger is frequently used.

Tube heat exchangers are already known that consist of a housing in which one or more tubes extend in the longitudinal direction between a first inlet and outlet part for a primary fluid, and a second inlet and outlet part for a secondary fluid, whereby the primary fluid flows around the tubes and the secondary fluid flows through the tubes, whereby heat is transferred between the two fluids.

In the known heat exchangers the space in the housing between the second inlet and outlet part can have baffles that guide the flow of the primary fluid in a zigzag pattern, for example.

In so doing the primary fluid cannot flow directly from the second inlet part to the second outlet part and the heat transfer is improved.

SUMMARY OF THE DISCLOSURE

The purpose of the present invention is to provide a solution to one or more of the aforementioned disadvantages and/or other disadvantages, by providing a device for compressing and drying gas, and this device contains a multistage compressor with a low pressure stage, a high pressure stage and a pressure pipe and an adsorption dryer with a drying zone and a regeneration zone, whereby an intercooler is placed between this low pressure stage and high pressure stage, and whereby the device is further provided with a heat exchanger that is connected to an inlet part by the aforementioned pressure pipe, and whereby the aforementioned heat exchanger contains a housing with a number of compartments, including a main compartment with an aforementioned inlet part and outlet part for a first primary fluid that is guided in this main compartment over or around tubes that extend through the main compartment; whereby there are at least two series of tubes that extend through the aforementioned main compartment, and which are each intended for guiding a secondary or tertiary fluid through the main compartment to exchange heat with the primary fluid; and whereby a first aforementioned series of tubes forms a cooling circuit of the aforementioned intercooler in order to heat up gas from the high pressure stage for the regeneration of the adsorption dryer.

An advantage is that the device is very simple to manufacture.

In the simplest embodiment of the heat exchanger of the device, the main compartment is closed off along one side by an end plate, whereby there is also a cover along the aforementioned side of the main compartment to form a side compartment between the cover and the end plate, whereby this side compartment contains the inlet and outlet compartments for the secondary and tertiary fluid and whereby U-shaped tubes are fastened to the end plate.

In another more preferable embodiment, the main compartment is bounded along two sides by an end plate, and on either side of the main compartment there is a cover to form two side compartments between each respective end plate and the cover opposite it.

An advantage is that fewer connections have to be made, such that the risk of leaks as a result of an imperfect connection is kept to a minimum.

Another advantage is that the installation cost of this device is rather low. The application of the heat exchanger according to the invention in this device thereby results in a more efficient method for compressing and drying gas, which of course favourably influences the cost of the gas supplied.

It is after all clear that the application in such a device for compressing and drying gas enables the functionalities of two heat exchangers to be integrated into one single heat exchanger, which of course saves material costs.

In the most practical embodiment the compressor is constructed as a multistage compressor with a low and high pressure stage, whereby there is an intercooler between this low and high pressure stage, whereby the inlet part of the heat exchanger is connected to the aforementioned pressure pipe of the compressor, and whereby a first aforementioned series of tubes form the cooling circuit of the aforementioned intercooler in order to heat up gas coming from the high pressure stage for the regeneration of the adsorption dryer.

An advantage is that a very energy-efficient device is realised, as the heat from the compressed gas can be recovered to heat up part of the gas originating from the high pressure stage, whereby the aforementioned gas fraction reaches a high temperature, and in so doing is suitable for use as a regeneration gas for the adsorption dryer.

An additional advantage is that, as a result of the integration of two heat exchangers into a single heat exchanger, the volume of the composite heat exchanger can be kept significantly smaller than the combined volumes of two separate heat exchangers, such that a substantial space saving can be realised.

A further additional advantage is that the application of the heat exchanger is not only limited to devices for compressing and drying gas, but the heat exchanger can also be used in applications without an adsorption dryer, subject to a few minor modifications.

DESCRIPTION OF THE DRAWINGS

With the intention of better showing the characteristics of the invention, a preferred embodiment of a device according to the invention is described hereinafter by way of an example without any limiting nature, with reference to the accompanying drawings, wherein:

FIG. 2 shows an alternative embodiment of FIG. 1;

FIG. 3 shows an example of a device for compressing and drying gas according to the invention;

DETAILED DESCRIPTION OF PREFERRED EMBODIMENTS

Figure 1:
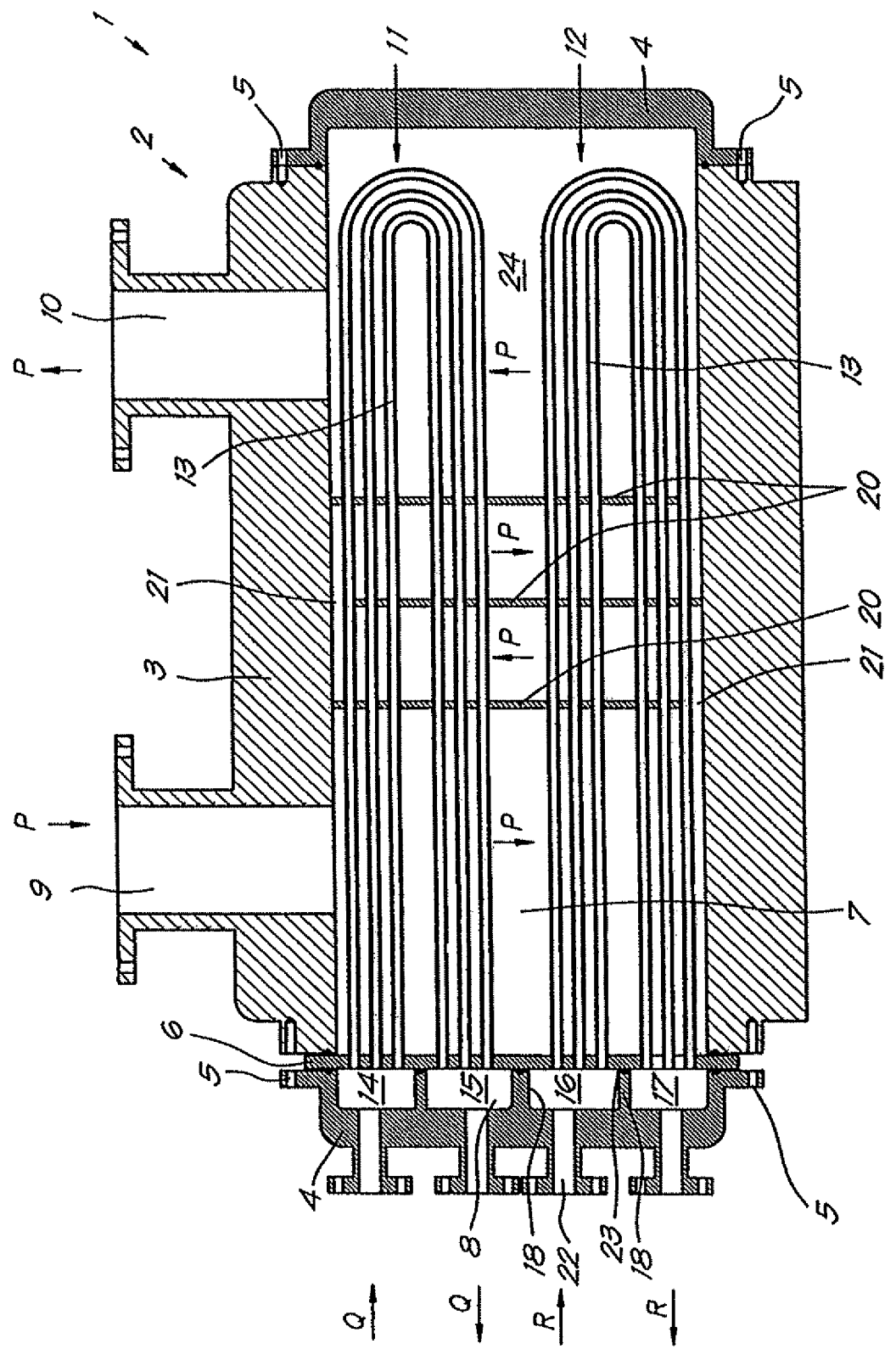
FIG. 1 schematically shows a cross-section of a first embodiment of a heat exchanger for the device.
Figure 9:
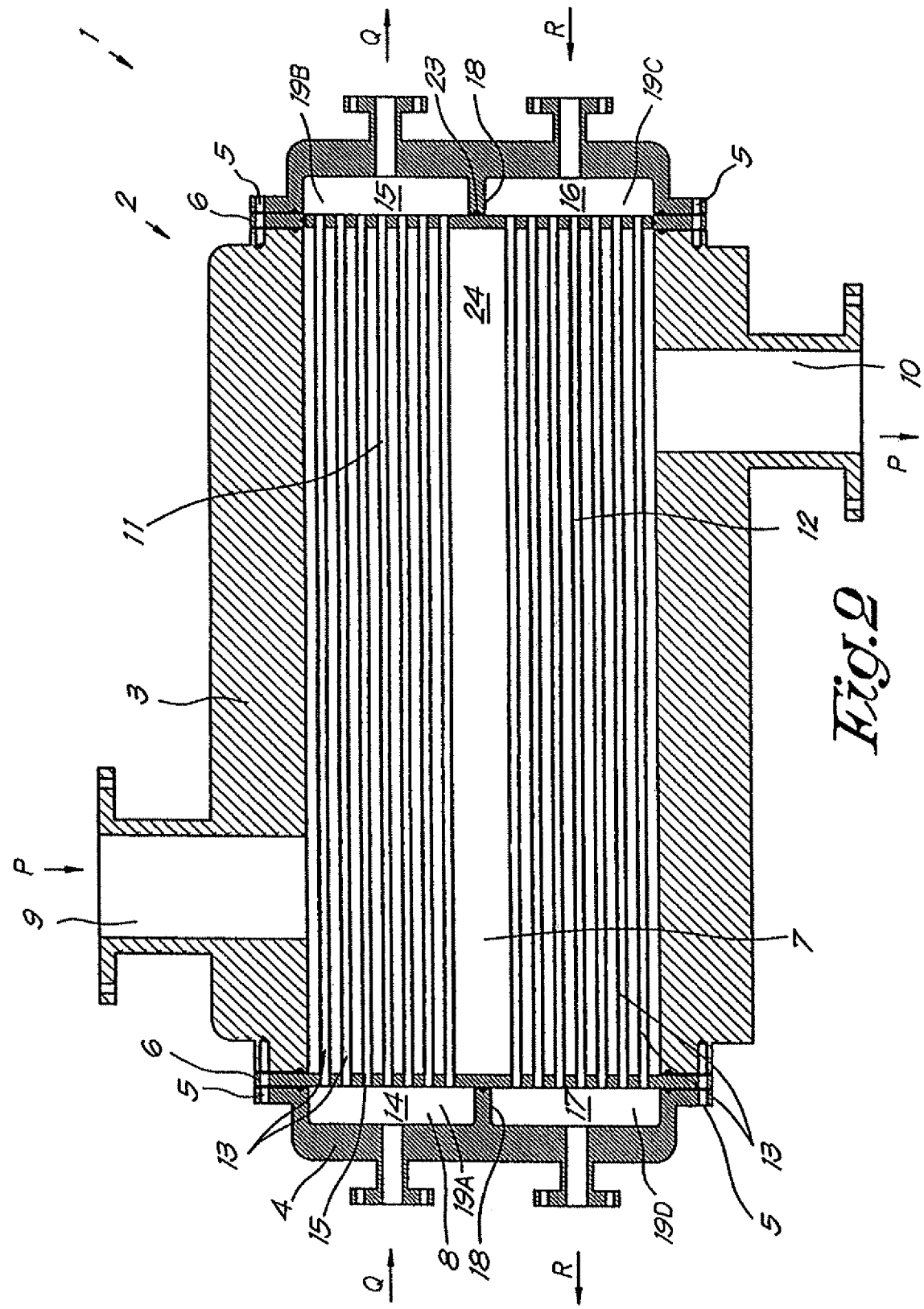

FIG. 1 schematically shows a first embodiment of a tube heat exchanger 1 for a device according to the invention, that primarily comprises a closed housing 2 with a shell 3, which in this case, but not necessarily, is cylindrical.

The housing 2 is closed on both sides by means of a cover 4, whereby the cover 4 is fastened to the cylinder shell 3, for example by means of bolts not shown in the drawings that can be screwed into threaded holes 5B in the shell 3 through passages 5A in the cover.

In this embodiment the housing 2 has an end plate 6 that forms the separation between a main compartment 7 and a side compartment 8, whereby the main compartment 7 is bounded by the shell 3 and the cover 4, and whereby the side compartment 8 is bounded by the end plate 6 and the cover 4 located on this side.

In the cylinder shell 3 there is an inlet part 9 and an outlet part 10 for guiding a primary fluid through the main compartment 7.

In the embodiment shown, the aforementioned inlet part 9 and outlet part 10 are situated on the same side of the shell 3, but they can of course also be put at other places in the shell 3.

In the heat exchanger 1 at least two series of tubes 11-12 extend through the main compartment 7, whereby the aforementioned series 11-12 are each intended for guiding a secondary or tertiary fluid through the main compartment 7, in order to exchange heat with the primary fluid that flows over or around that tubes 13 in the main compartment 7.

The ends of the tubes 13 of the first series 11 are connected to a first inlet compartment 14 and a first outlet compartment 15 for the secondary fluid. Similarly, the ends of the tubes 13 of the second series 12 are connected to a second inlet compartment 16 and a second outlet compartment 17 for the tertiary fluid. According to the invention, the aforementioned inlet and outlet compartments 14-17 are completely separated from one another.

To this end, in the embodiment shown the side compartment 8 is divided by a number of partitions 18 into four sub-compartments 19, respectively the first inlet compartment 14, the first outlet compartment 15, the second inlet compartment 16, and the second outlet compartment 17 for the second series of tubes 12.

In the embodiment shown the tubes 13 are U-shaped, whereby one side of each tube 13 of the first series 11 opens into the first inlet compartment 14 and the other side opens into the first outlet compartment 15. Analogously the tubes 13 of the second series 12 open into the second inlet and outlet compartments 17-18, all such that the circuits of the secondary and tertiary fluids are completely separated from one another.

In the embodiment of FIG. 1 the main compartment 7 is equipped with baffles 20 (also called bafflers) whose shape and relative position are chosen such that a certain pattern of flow is imposed on the primary fluid, such as a zigzag pattern for example, such that the primary fluid flows through the main compartment in a number of passes in a back and forth motion.

To this end the baffles 20 extend from one side of the main compartment 7 to a certain distance from the other side of the main compartment 7, to form reversing passageways 21 for the primary fluid and this in such a way that the successive reversing passageways 21 alternate on the one or the other side of the heat exchanger 1.

The baffles are preferably made of stainless steel but the invention is by no means limited to this.

In another embodiment of the invention, passages are put in the baffles 20 with a diameter that practically match or which are slightly larger than the diameter of the tubes 13, whereby there is a limited margin between the baffles 20 and the tubes 13.

The presence of the baffles 20 in the heat exchanger 1 is not necessary.

FIG. 2 schematically shows a preferred different embodiment of a tube heat exchanger 1 for a device according to the invention that primarily comprises a closed housing 2 with a main compartment 7, whereby the main compartment 7 has a first inlet and outlet part 9-10 for a first primary fluid that is guided in the main compartment 7 over or around the tubes 13 that extend through the main compartment 7.

In this embodiment the aforementioned inlet and outlet part 9-10 are located on opposite sides of the shell 3, and which are as far from one another as possible, as seen from an axial direction.

This more or less diagonal arrangement of the inlet and outlet part enables a more efficient heat transfer.

It is of course possible for the inlet and outlet part 9-10 for the primary fluid to be on the same side of the shell 3 or at other places in the shell 3.

In contrast to the embodiment of FIG. 1, in FIG. 2 the main compartment 7 is bounded by two end plates 6 and on either side of the main compartment 7 there is a cover 4 to form two side compartments 8 between each respective end plate 6 and the cover 4 opposite it.

In the most practical embodiment of the invention, the tubes 13 that extend through the main compartment 7 are fastened on one of the two end plates 6A, whereby this end plate 6A is clamped between the housing 2 and the cover 4A located opposite this end plate 6A.

The tubes 13 are thereby secured in a gas tight manner in the passages of the end plates 6, for example by soldering or similar.

Preferably the end plates 6 are different to one another and one of the two end plates 6B has smaller dimensions, which enables this end plate 6B to be arranged in a floating manner, all such that the thermal expansion is accommodated.

In the cross-section of FIG. 2, the end plate 6A to which the tubes 13 are secured has larger dimensions than the other end plate 6B, and the smallest end plate 6B is affixed movably in a ring between the shell 3 and the cover 4B.

In this embodiment, the side compartments 8 are connected together on either side of the aforementioned end plates 6 by means of parallel tubes 13, whereby the aforementioned tubes 13 run through the main compartment 7 and extend through passages 22 in these end plates 6.

Of course baffles can also be provided in this embodiment, but this is not necessary.

According to a preferred characteristic of the heat exchanger, the aforementioned side compartments 8 are subdivided into two or more sub-compartments 19.

To this end, in the cross-section shown, on the inside of the cover there are one or more straight upright walls or partitions 18 and there is a seal 23 between the edges of these walls 18 and the end plate 6.

In the variant according to FIG. 2, in each side compartment 8 there are two sub-compartments 19 for guiding a secondary or tertiary fluid.

In the cross-section of FIG. 2, a first sub-compartment 19A connects to a first series 11 of tubes in the main compartment 7, and all tubes 13 of the aforementioned series 11 open out into the same sub-compartment 19B on the other side of heat exchanger 1.

The sub-compartments 19A and 19B are thereby situated in line with one another.

Analogously, the two other sub-compartments 19C-19D can be connected together by a second series 12 of tubes.

Preferably the sub-compartments 19 for the secondary and tertiary fluid are completely separated from one another and each fluid circulates in its own separate circuit for the fluid concerned.

Although it could be derived from the cross-section shown that the number of tubes 13 of the two series 11-12 must be the same, arrangements are also possible whereby the number of tubes 13 is different for the secondary and tertiary fluid.

Of course the diameters of the tubes 13 for the secondary and tertiary fluid can also differ from one another.

It is also possible that the tubes 13 for the secondary and tertiary fluid can also present a different internal form and/or that a few tubes 13 can be provided with fins or other means in order to foster the heat transfer between the primary fluid and the secondary and/or tertiary fluid.

In the simplest embodiment, the aforementioned first series of tubes 11 for the secondary fluid is situated in the top half of the heat exchanger 1 and the tubes of the second series 12 for the tertiary fluid are in the bottom half.

At the level of the aforementioned wall 18 and seal 23, a space 24 is left in the main compartment 7 between the first and second group of tubes 11-12.

Of course the heat exchanger is not limited to such arrangements shown and alternative arrangements are also possible, such as for example a concentric arrangement in which the tubes of the first group 11 are located around the axis of the heat exchanger 1 and whereby the second group of tubes 12 forms a concentric ring of tubes around the aforementioned first group 11.

Another possible arrangement is with the tubes of the first series 11 distributed over a first sector of a circle, and the tubes of the second series 12 are distributed over another sector of a circle.

Of course the two sectors do not necessarily have to be the same size and together they can form a full circular disk or otherwise.

The operation of the heat exchanger 1 for a device according to the invention is very simple and as follows.

A primary fluid is guided to the main compartment 7 via the inlet part 9 in the shell 3, whereby when flowing through the main compartment 7 this primary fluid is guided by means of any baffles 20 according to a certain pattern, as indicated by the arrows P in FIG. 1.

At the same time two fluids, that may or may not be different, flow through the tubes 13 of the main compartment 7, i.e. a secondary fluid that flows through the tubes 13 of the first series 11 in a direction according to the arrow Q, and a tertiary fluid that flows through the tubes 13 of the second series 12 in a direction R.

In the cross-section shown, the directions Q and R of the secondary and tertiary fluid are opposite one another, but this is not a strict requirement of the device according to the invention.

As a result, in the main compartment 7 heat will be transferred between the primary fluid and the secondary fluid on the one part and between the primary fluid and the tertiary fluid on the other part.

It goes without saying that the secondary and tertiary fluid that flows through the tubes 13 can be a gas, gas mixture or liquid, or that the secondary fluid is a gas and the tertiary fluid a liquid or similar.

The heat exchanger 1 is particularly suitable for a device according to the invention for compressing and drying gas, an arrangement of which is shown in FIG. 3 by way of an example.

This device 25 consists of a compressor device 26 and an adsorption dryer 27 and has an inlet 28 that connects to the entrance of the compressor device 26, and an outlet 29 that guides the dried compressed gas to a consumer network not shown in the drawing.

The compressor device 26 shown is a multistage compressor with, in this case, three compressor elements 30-32 connected in series to form a low pressure stage 30, a medium pressure stage 31 and a high pressure stage 32.

Each compressor element 30-32 is driven by an electric motor 33, and downstream from each compressor element 30-32 there is a cooler 34-36, respectively two intercoolers 34-35 and an after-cooler 36.

Each of the aforementioned coolers 34-36 cool the gas compressed by the compressor element 30-32 concerned.

Preferably, there are liquid-gas coolers in such a device 25, whereby the gas to be cooled is guided through the cooler 34-36 as a primary fluid, and a coolant is guided through the tubes as a secondary fluid.

Between the low-pressure stage 30 and the medium pressure stage 31 there is a heat exchanger 37 upstream from the intercooler 34, which together with the intercooler 34 is integrated into a heat exchanger 1 in a device according to the invention.

In FIG. 3 the heat exchanger 1 is schematically shown by a box around the heat exchanger 37 and the intercooler 34.

Preferably the heat exchanger 1 has an inlet part 9 for the compressed gas originating from the low pressure stage 30 and an outlet part 10 that is connected to the inlet of the medium pressure stage 31.

The heat exchanger 37 has an inlet compartment 14 that is directly connected via a branch pipe 38 to the outlet pipe 39 of the high pressure stage 32 for tapping off a quantity of compressed gas along the direction of the arrow Q.

Furthermore the heat exchanger has an outlet compartment 15 that is connected to the regeneration zone of the adsorption dryer 27.

The intercooler 34 has an inlet compartment 16 and outlet compartment 17 that act as an inlet and outlet for an external cooling circuit, for example a flow of water that flows through this intercooler 34 in the direction of the arrows R.

In the arrangement shown the entire flow of the gas, that is compressed by the low pressure stage 30, flows through the heat exchanger 37 and through the intercooler 34 and this in the direction of the arrows P.

The adsorption dryer 27 is for example of the type with a rotating drum with regeneration zone 40 and a drying zone 41 that is filled with a desiccant, whereby the desiccant is sent alternately through this drying zone 41 and regeneration zone 40 by means of a motor.

After cooling in the after-cooler 36, the compressed gas from the high pressure stage 32 is guided through the drying zone 41 via an ejector 42, and after drying is sent to a consumer network via the outlet 29.

The gas that leaves the heat exchanger 37 via the outlet compartment 15 is linked back to the dryer 27 and guided through the regeneration zone 40 to then be combined, via a cooler 43 and via the aforementioned ejector 42, with the gas that is sent through the drying zone 41.

It is clear that a combined heat exchanger for a device according to the invention constitutes a dual function and acts as a first heat exchanger that fulfils the role of intercooler 34, whereby an external cooling fluid is used, and a second heat exchanger 37, whereby a tapped-off part of hot gas from the high pressure stage 32 is first additionally heated by bringing this gas into contact with the gas from the low pressure stage 30, whose temperature in the arrangement shown is higher than that of the compressed gas of the high pressure stage 32.

In this way a more efficient operation of the adsorption dryer 27 is obtained.

It is clear that in the device shown, the compression heat of the first low pressure stage 30 is recuperated, in contrast to the better known simpler devices where this heat is lost with the coolant that flows through the first intercooler 34.

In addition such a device is extra beneficial because an external heating element is not required to heat up the regeneration gas and because the intercooler 34 can be kept smaller.

Figure 4:
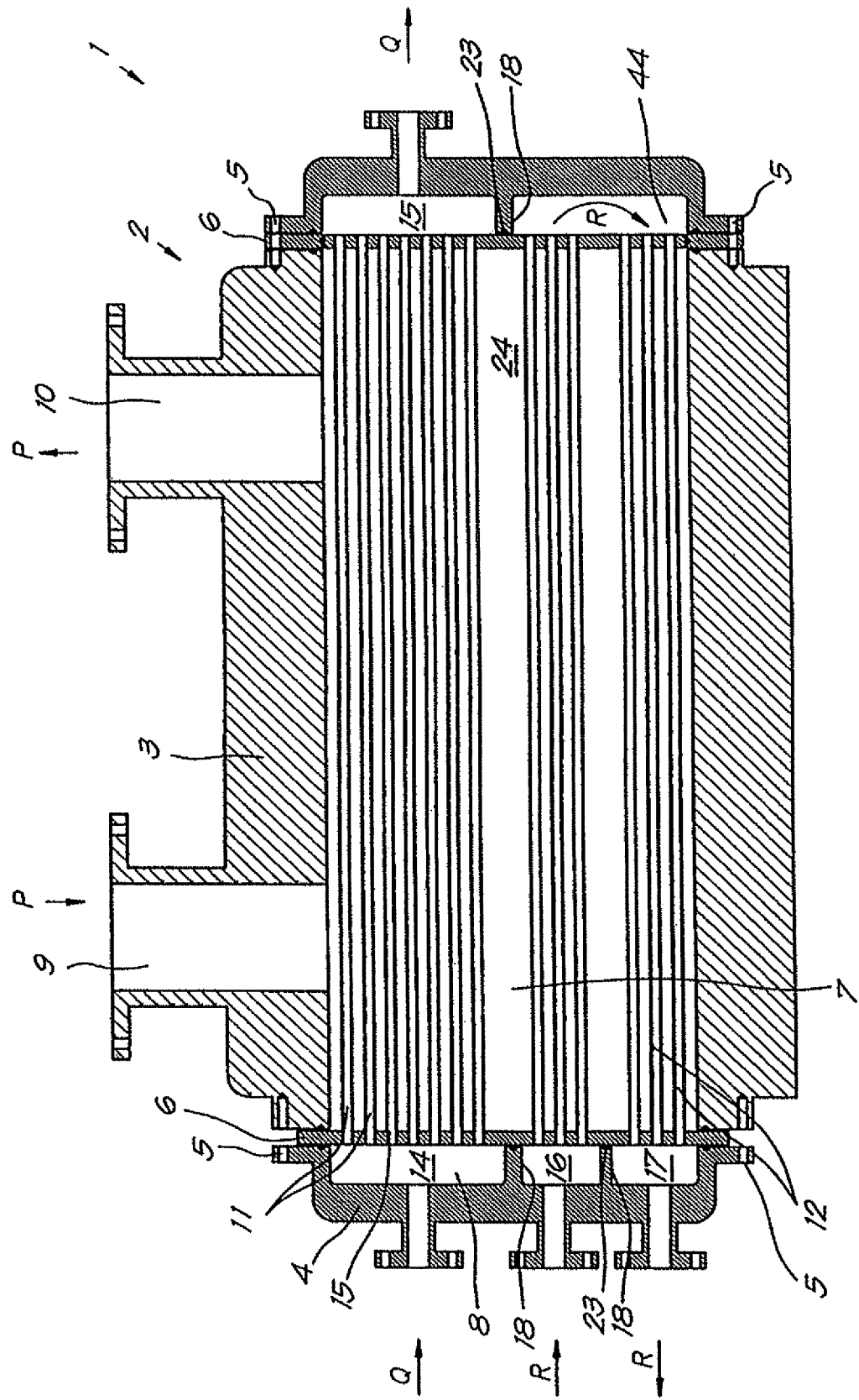
FIG. 4 shows an alternative embodiment of FIG. 2.

FIG. 4 shows another possible variant of a heat exchanger for a device according to the invention that is different to the one of FIG. 2 in that the inlet compartment 16 and outlet compartment 17 for the tertiary fluid are situated in the same cover 4.

To this end, one of the two side compartments 8 has an extra wall so that the inlet and outlet compartment 16-17 for the tertiary fluid are completely separated from one another.

In the cross-section shown, the tertiary fluid of the inlet compartment 16 flows through the bottom series 12 of tubes to the outlet compartment 17 via the top series 12 of tubes via the compartment 44.

Although in FIG. 4 there are no baffles 20 in the main compartment 7, variants with baffles 20 are possible so that the primary fluid flows through the main compartment 7 in a number of passes in a back and forth motion.

It will be clear to a man skilled in the art that many other variants are also possible, whereby for example a cover 4 contains the inlet compartment 14 and outlet compartment 15 of the secondary fluid and the other cover 4 contains the inlet compartment 16 and outlet compartment 17 of the tertiary fluid.

It is also not excluded to provide two inlet compartments 14-16 and two outlet compartments 15-17 in a single cover so that the other cover can be constructed without inlet or outlet compartments.

It will be clear to a man skilled in the art that there are many possibilities for the choice of the position and size of the different sub-compartments, and that certain arrangements could be more beneficial for example, depending on the practical application.

The present invention is by no means limited to the embodiment described as an example and shown in the drawings, but a device according to the invention can be realised in all kinds of variants, without departing from the scope of the invention.

The invention claimed is:

1. A device for compressing and drying gas, comprising:
a multistage compressor having a low pressure stage, a high pressure stage with a pressure pipe and an adsorption dryer with a drying zone and a regeneration zone;
an intercooler located between the low pressure stage and high pressure stage,
a heat exchanger connected to an inlet part by the pressure pipe,
the heat exchanger including a housing with a number of compartments, including a main compartment with said inlet part and an outlet part for a first primary fluid that is guided in the main compartment over or around tubes that extend through the main compartment;
at least two series of tubes that extend through the main compartment, and which are each configured to guide a secondary or tertiary fluid through the main compartment to exchange heat with the primary fluid;
the ends of the tubes being connected respectively to a separate inlet compartment and outlet compartment for each series of tubes;
a first of said series of tubes forming a first cooling circuit of the intercooler,
a second of said series of tubes forming a second cooling circuit of the said heat exchanger;
the inlet compartment of said second series of tubes being directly connected via a branch pipe to an outlet pipe of said high pressure stage; and
the outlet compartment of said second series of tubes being connected to said regeneration zone of said adsorption dryer and arranged to heat gas coming from the high pressure stage for the regeneration of the adsorption dryer.

2. The device according to claim 1, wherein the main compartment comprises a number of inlet and outlet parts for a number of primary fluids.

3. The device according to claim 1, wherein the main compartment is bounded by two end plates and on either side of the main compartment a cover forms two side compartments between each respective end plate and a cover opposite it.

4. The device according to claim 3, wherein the tubes are fastened in one of the end plates.

5. The device according to claim 3, wherein the side compartments include the inlet and outlet compartments.

6. The device according to claim 5, wherein the side compartments are subdivided into two or more sub-compartments and the respective sub-compartments are connected on either side of the main compartment by the series of tubes such that at least two separate circuits for at least the respective secondary and tertiary fluid are formed.

7. The device according to claim 1, wherein the main compartment includes baffles, for the primary fluid.

8. The device according to claim 3, wherein the heat exchanger includes two or more extra fluids and the respective side compartments are subdivided on either side of the main compartment by partitions in the inlet and outlet compartments, including a first inlet and outlet compartment that connects to a first group of tubes and guides a secondary fluid and a second inlet and outlet compartment connecting a second group of tubes guiding a tertiary fluid.

9. The device according to claim 8, wherein a seal is provided between the partitions and end plates.

10. The device according to claim 8, wherein a space is provided between the first group and second group of tubes.

11. The device according to claim 8, wherein the tubes of the first and second group are distributed over a sector of a circle.

12. The device according to claim 8, wherein the tubes are distributed in a concentric arrangement, so that the first group of tubes is located within a circle and the second group of tubes is located in a ring around said circle.

13. The device according to claim 1, wherein the inlet and outlet part of the heat exchanger are located on a side of a shell that borders the main compartment.

14. The device according to claim 8, wherein the first inlet and the first outlet compartment are located on an opposite side of the heat exchanger, while the second inlet and outlet compartment are located on the same side of the heat exchanger.

* * * * *